(12) United States Patent
Niemczyk et al.

(10) Patent No.: US 6,641,724 B1
(45) Date of Patent: Nov. 4, 2003

(54) TANGENTIAL SEPARATING DEVICE FOR SOLID MATTER

(75) Inventors: Bernhard Niemczyk, München (DE); Robert Heinz, München (DE); Lucas Menke, Müchen (DE); George Troubounis, München (DE)

(73) Assignee: Meri Entsorgungstechnik fur die Papierindustrie GmbH, Munich (DE)

( * ) Notice: Subject to any disclaimer, the term of this patent is extended or adjusted under 35 U.S.C. 154(b) by 0 days.

(21) Appl. No.: 09/889,775

(22) PCT Filed: Aug. 25, 1999

(86) PCT No.: PCT/DE99/02707

§ 371 (c)(1),
(2), (4) Date: Jul. 20, 2001

(87) PCT Pub. No.: WO95/23027

PCT Pub. Date: Aug. 31, 1995

(30) Foreign Application Priority Data

Jan. 20, 1999 (DE) .......................................... 199 02 148

(51) Int. Cl.[7] .............................................. B01D 35/00
(52) U.S. Cl. ..................... 210/205; 210/207; 210/220; 210/221.2; 210/524; 210/525; 210/528
(58) Field of Search ................. 210/703–705, 210/738, 205, 207, 208, 220, 221.1, 221.2, 525, 524, 528

(56) References Cited

U.S. PATENT DOCUMENTS

| | | | | |
|---|---|---|---|---|
| 2,874,842 A | * | 2/1959 | Krofta | 210/703 |
| 3,179,252 A | * | 4/1965 | Vrablik | 210/120 |
| 3,733,272 A | * | 5/1973 | Burns | 210/221.2 |
| 4,146,471 A | * | 3/1979 | Wyness | 210/715 |
| 5,124,034 A | * | 6/1992 | Maness | 210/195.3 |
| 5,716,519 A | * | 2/1998 | Schleife et al. | 210/206 |
| 5,958,249 A | * | 9/1999 | Fassbender et al. | 210/739 |
| 6,475,384 B1 | * | 11/2002 | Overath | 210/221.2 |

FOREIGN PATENT DOCUMENTS

| | | | |
|---|---|---|---|
| EP | 0555784 A1 | * | 8/1993 |
| GB | 1459195 | * | 12/1976 |
| GB | 2079618 | * | 1/1982 |
| GB | 2153262 | * | 8/1985 |
| WO | WO 95/23027 | * | 8/1995 |

* cited by examiner

Primary Examiner—Peter A. Hruskoci
(74) Attorney, Agent, or Firm—Pennie & Edmonds LLP

(57) ABSTRACT

The invention relates to a device and a method for chemically and physically separating solid materials from a suspension using flotation. A rotationally symmetrical flocculation/flow reactor is provided with outlets in the lower part thereof and is arranged in a separating tank. At least one suspension inlet extends eccentrically into said reactor. The supplied suspension is guided into said reactor. The supplied suspension is guided into the upper area of the flocculation reactor via the suspension inlet. A circular flow is thus created which drains off from the flocculation reactor downwards in a tangential and radial manner over the outer circumference into circularly arranged distribution cells which reinforce the tangential component of the suspension flow when said flow is delivered into the separating tank. In prior art, the flow of the mixture consisting of the suspension and air-sacs extends radially outwards. One advantage of the invention is that said flow of the mixture has to travel a longer way to the outlets in the area of the wall of the tank due to the tangential flow component. The solid matter can be separated more effectively by virtue of the longer travel path or the longer presence in the separating tank.

32 Claims, 5 Drawing Sheets

Figure 1:
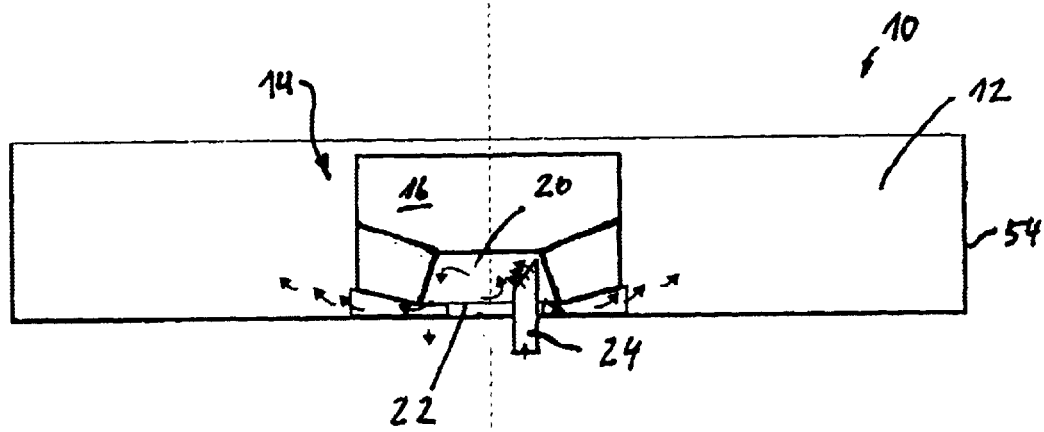

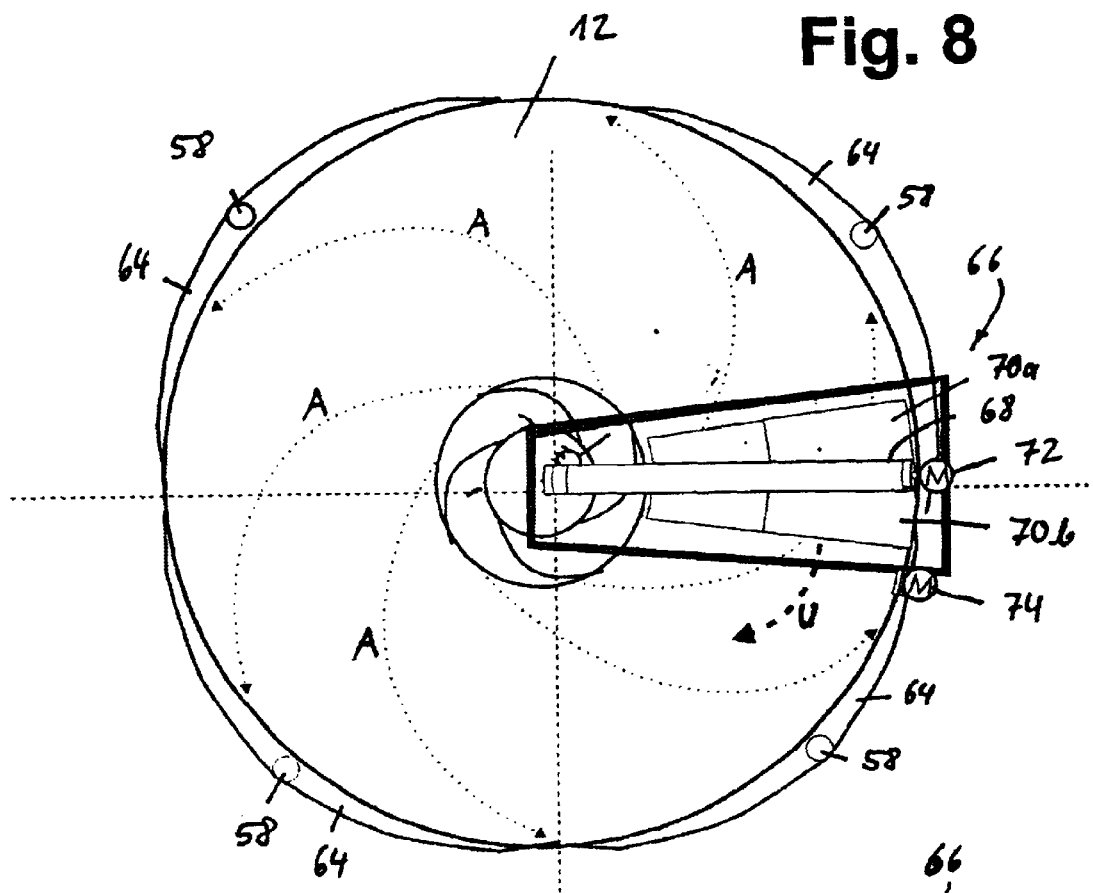
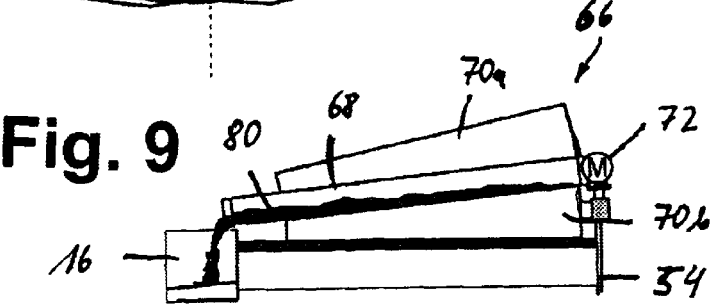
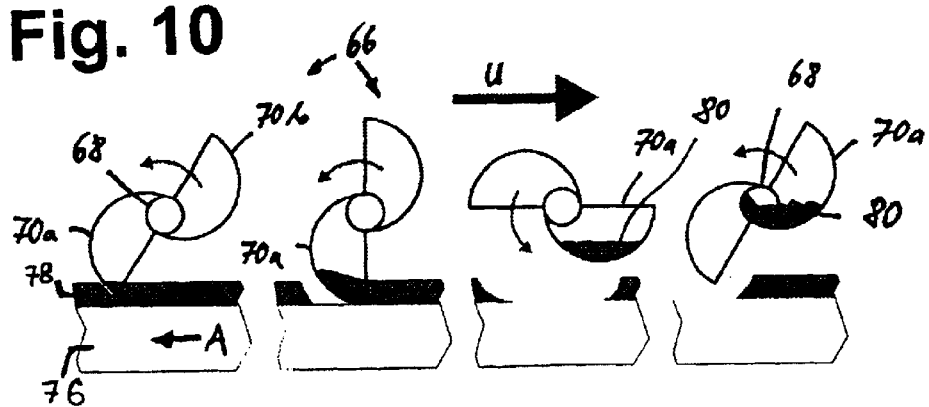

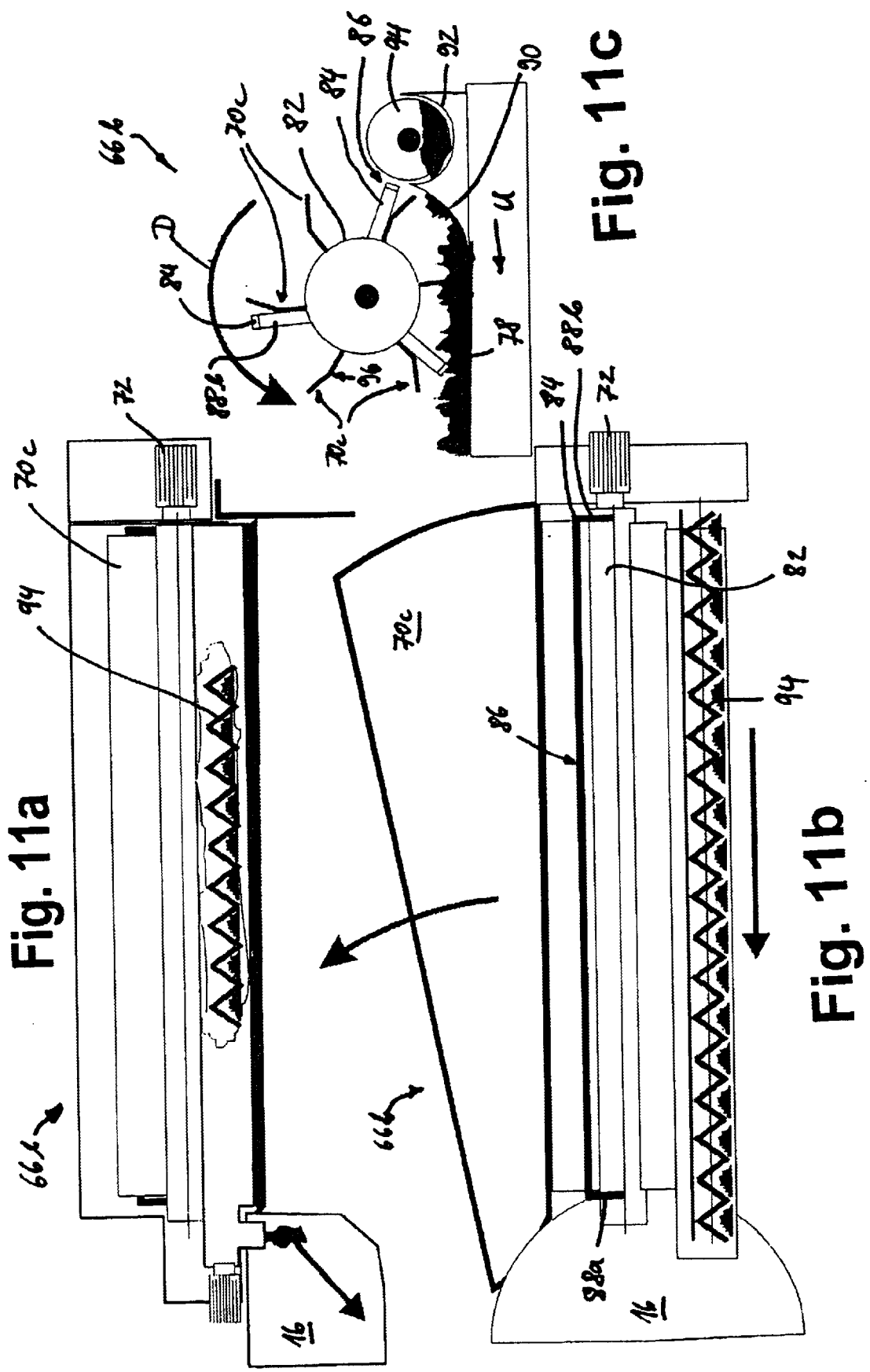

TANGENTIAL SEPARATING DEVICE FOR SOLID MATTER

The invention relates to a device and a method for the physical separation of solid matter from suspensions using the flotation method in an essentially cylindrical separating tank. Devices of this type are, for example, known from EP-A-0 442 463 or WO 95/23027.

Based on these previously known devices or methods, the object of the present invention is to further improve the degree of separation in the separation of solid matter of generic devices and methods.

A rotationally symmetrical flocculation reactor, closed at the top and which preferably expands downward in its diameter, is arranged centrally in the middle in the cylindrical separating tank.

The suspension inlet does not take place concentrically in the flocculation reactor but preferably via a vertical inlet pipe, the eccentrical supply and the inlet pipe, preferably open on one end, resulting in the formation of a gentle, downward-directed and decelerating circulation flow which decisively promotes the flocculation process required for the separation of solid matter by flotation. An overflow edge, situated on the periphery and enabling the suspension to flow out of the flocculation reactor, is found at the lower end of the rotationally symmetrical flocculation reactor.

The liquid/suspension flowing out of the flocculation reactor flows into distribution cells situated on the outer periphery of the flocculation reactor, said distribution cells having a geometrical form such that a tangentially directed flow into the separating tank results at the end of the distribution cells, i.e. an inlet angle that also has, in addition to the radially directed flow component, a tangential flow component.

A pressure-release inlet is arranged in the flocculation/flow reactor in which the release pressure of a liquid oversaturated with gas can be reduced via an annular aperture. The bubbles resulting from the excess gas form a carpet of bubbles which flows radially outward from the pressure-release inlet in an almost horizontal direction, comes to lie beneath the gentle, downward-directed decelerating circulation suspension flow resulting in the flocculation/flow reactor and/or mixes with it. As a result of the adjustable annular aperture of the pressure-release inlet, an operation at various release pressures is possible which enables an optimum control of the bubble sizes that is dependent on the absolute level of the release pressure.

The solid floccules resulting in the circular flow of the flocculation/flow reactor are thus optimally underlaid or mixed with a bubble carpet and tangentially introduced into the separating tank via the distribution cells disposed on the outer periphery of the flocculation reactor.

In a preferred embodiment, the distribution cells are formed in such a way that the tangential components of the direction of flow are larger than the radial components. Even more preferable, the ratio of the tangential components to the radial components is 1:1 to 50:1, especially preferred 2:1 to 5:1.

In order to use flotation more successfully as chemical and physical separating methods, an optimal formation of solid floccules/solid bonds is an essential prerequisite for obtaining good separation results, whereby the use of chemical flocculation adjuvants (e.g. polymers) are prior art nowadays, however, the costs of these flocculation adjuvants represent a considerable operating cost factor.

The use of flocculation adjuvants or solid flocculation can be considerably optimized thereby that the flocculation itself takes place in its own reaction chamber at defined, non-turbulent flow conditions while maintaining specific, even the shortest reaction times. This was not taken into consideration in the previous prior art.

The present invention optimally meets these requirements for an improved flocculation and enables the reduced use of flocculation adjuvants with the flocculation/flow reactor in which a gentle downward-directed circulation flow is produced by the eccentric inflow.

In the previous prior art, the mixing of the bubbles produced by oversaturation mostly takes place in pipes or narrow flow chambers at high flow velocities of about 1.6 to 3 m/s, in addition, the paths from the bubble formation until mixing and to the start of the effective flotation are long (3 to 10 m). Both factors result in disadvantages; high flow velocities and long paths destroy formed floccules or inhibit/prevent flocculation, the smallest bubbles produced by oversaturation coalesce to form larger bubbles which are less effective for flotation.

On the other hand, in the present invention, the bubbles are gently mixed in without affecting the floccules in the flocculation/flow reactor at reduced velocity, short paths of preferably 0.5 to 1 m up to the separating tank in which the flotation takes place, prevent coalescence of the bubbles and enable improved flotation with the smallest bubbles.

A further advantage of the invention lies therein that the flow of the mixture consisting of suspension and air bubbles that is usually directed purely radially outward must travel a longer path to the outlet openings in the area of the tank wall due to the tangential flow component than in conventional separating methods with purely radial flow, so that the separation of solid matter is carried out in a more effective manner due to the longer paths or the longer stay in the separating tank. In addition, the flow-off is also calmer which also results in an improved separation. Thus, the device of the invention can be configured more compact vis-a-vis previously known designs.

A preferred further embodiment of the invention provides that the pressure-release inlet comprises an axially movable, preferably conical adjusting piston, a more or less narrower annular aperture being formed by its axial adjustment, the liquid mixed with the released gas passing through said annular aperture under the sudden fall in pressure. By adjusting the aperture, depending on the desired flow throughput, the fall in pressure can be set in such a way that a suitable bubble size results which is advantageously between 10 $\mu$m and 1500 $\mu$m.

An advantageous further embodiment of the invention provides that deflecting devices be provided above the pressure-release inlet which serve to bundle the flow of the bubble-added liquid in horizontal/radial direction, so that a two-layer flow is formed, the bubble-added liquid running at the bottom of the tank and the suspension flow above it.

As soon as the liquid freed of solid material reaches the area of the outer wall of the separating tank, it is removed from the separating tank via specially designed outlet openings and conveyed to a liquid outlet via collecting pipes. Preferably, the outlet openings are configured in a slot-shaped manner, these slots being located over the entire periphery of the wall of the tank above the floor. These outlet openings are brought together in groups by suitable channels or lines and communicate with a number (preferably 4) of outlets distributed along the periphery of the tank.

An arrangement to be provided alternatively or in addition for draining the clarified liquid lies therein that at least one surrounding discharge pipe is situated on the outer wall of the separating tank above the base of the tank and provided with a plurality of outlet ports. Preferably, these outlet ports are situated in the lower area of the discharge pipes, so that the inlet into the discharge pipe takes place from the bottom, in order to effectively prevent sinking substances from blocking the openings. This discharge pipe communicates via a connecting line with an outlet. Alternatively, it is also possible to divide this discharge pipe into several, preferably 3–4 discharge pipe sections, which together produce a complete ring and each communicate with their own outlets. Especially simple from a technical point of view, the discharge pipes may be realized if they consist of straight pipe pieces connected to one another and, in this way, form a type of polygonal discharge pipe.

According to a further advantageous embodiment of the invention, a rotating sludge removal device is provided above the separating tank which preferably comprises at least two sludge paddles which both turn about their own common axis of rotation inclined slightly to the horizontal and about the vertical axis of the separating tank.

An especially preferred further embodiment of the invention provides that the direction of rotation of the sludge-removal device travels opposite to the tangential component of the flow of the suspension, as a result of which the relative velocity is increased between the sludge paddles and the sludge flow in the upper area of the filled tank which leads to an improved and more effective discharge, in particular of the solid fibers contained in the suspension.

An especially effective removal of the sludge can be obtained with a further embodiment according to the invention in which several scooping devices are provided which are distributed about the periphery of a rotating shaft and which convey the sludge in a discharge outlet extending parallel to the shaft, each scooping device consisting of a bow-like blade and a sludge paddle. The sludge is cut into by means of the bow blade, preferably configured rectangular, and the removal of the loosened sludge thus facilitated by the following sludge paddle. This further embodiment has special advantages with heavily packed, encrusted or otherwise hardened sludge formations.

In a simple embodiment, the base of the separating tank can be configured flat. A preferred alternative embodiment of the invention provides that the base is configured in an annular channel-like manner and comprises at least one sediment outlet, as a result of which heavy parts deposited during the separating process can be effectively removed.

The aforementioned embodiments of the invention produce a separation of the suspension on the flotation principle. Alternatively, it is also possible to carry out a separation on the sedimentation principle, whereby especially the introduction of a liquid mixed with gas is omitted, i.e. only a suspension inlet is provided for introducing the suspension to be freed from solid matter, it being possible to convey this suspension through the separating tank in the same way as in the embodiments described above through the eccentric arrangement of the suspension inlet with a tangential velocity component.

Figure 2:
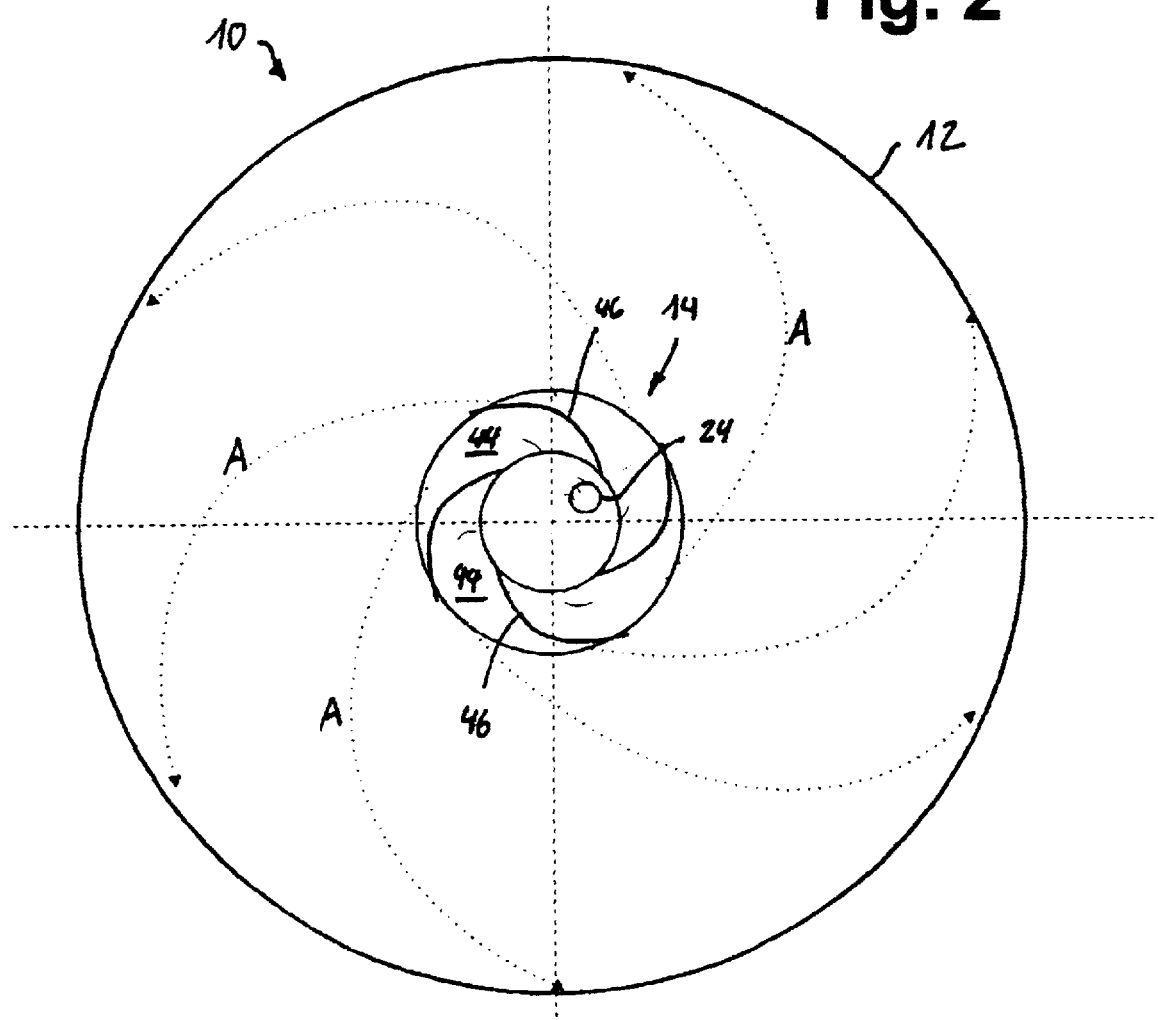
Figure 3:
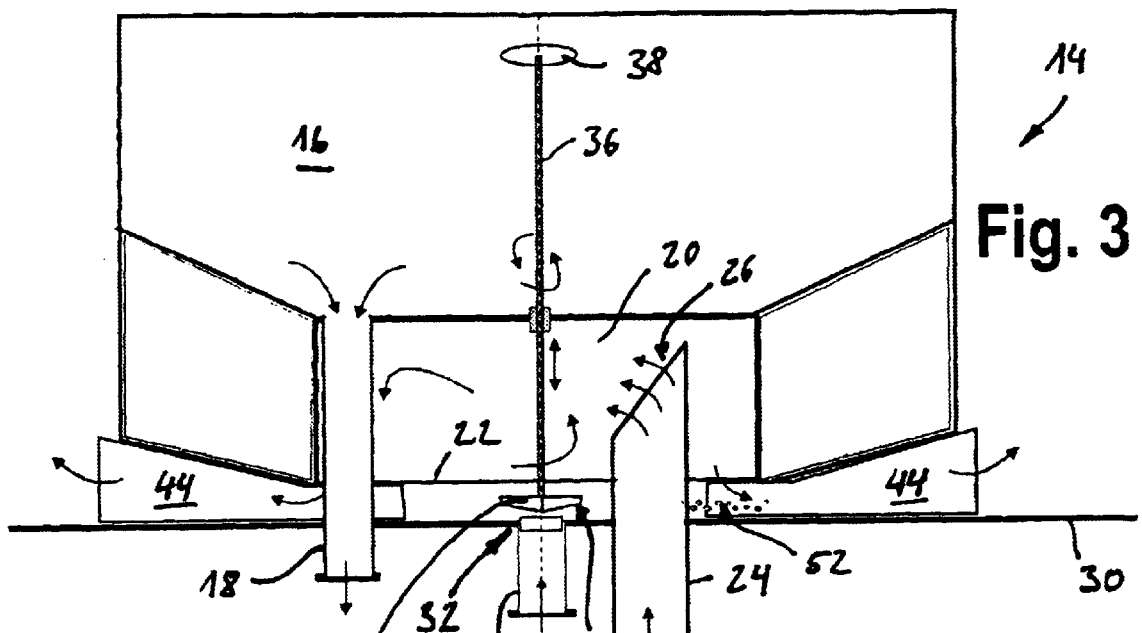
Figure 4:
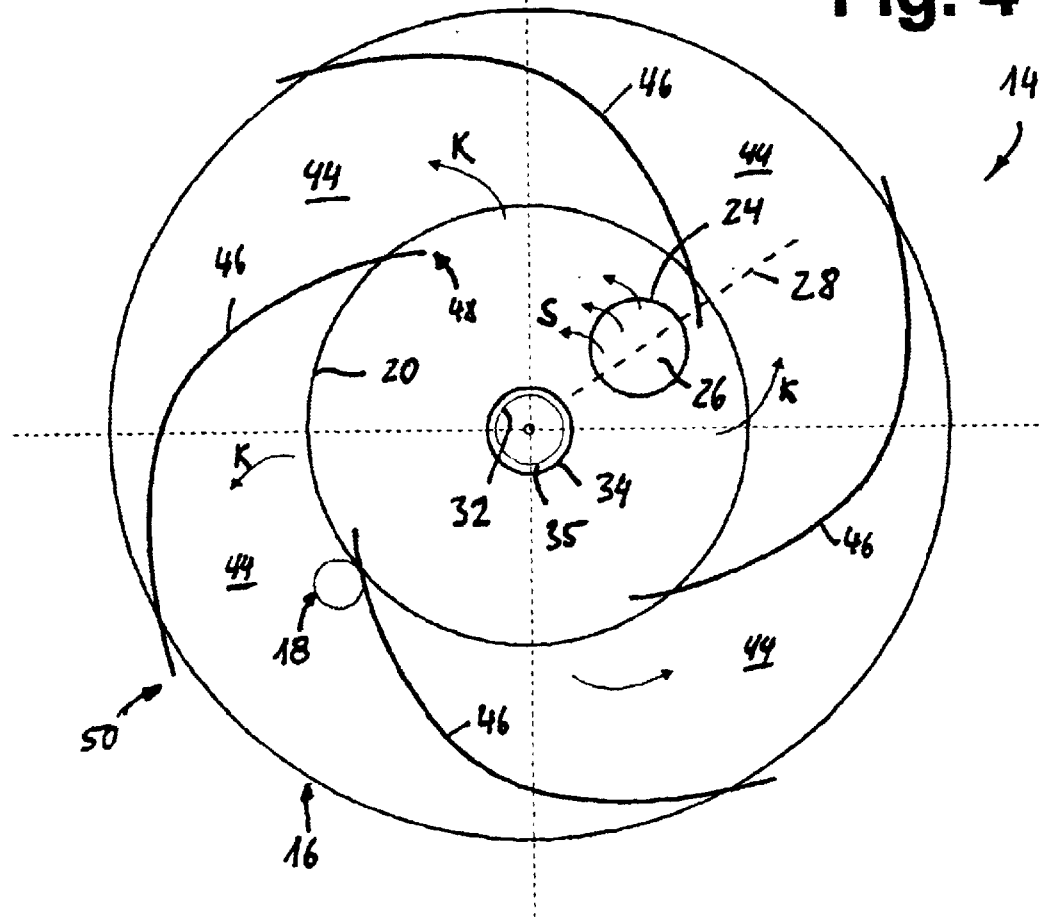
Figure 7:
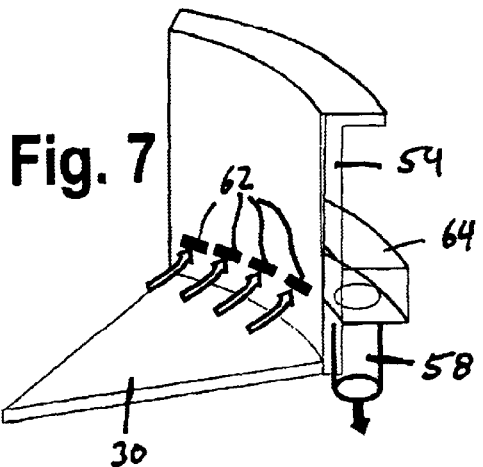
Figure 6:
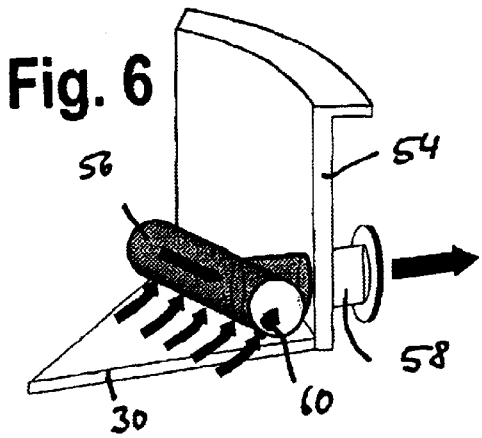
Figure 5:
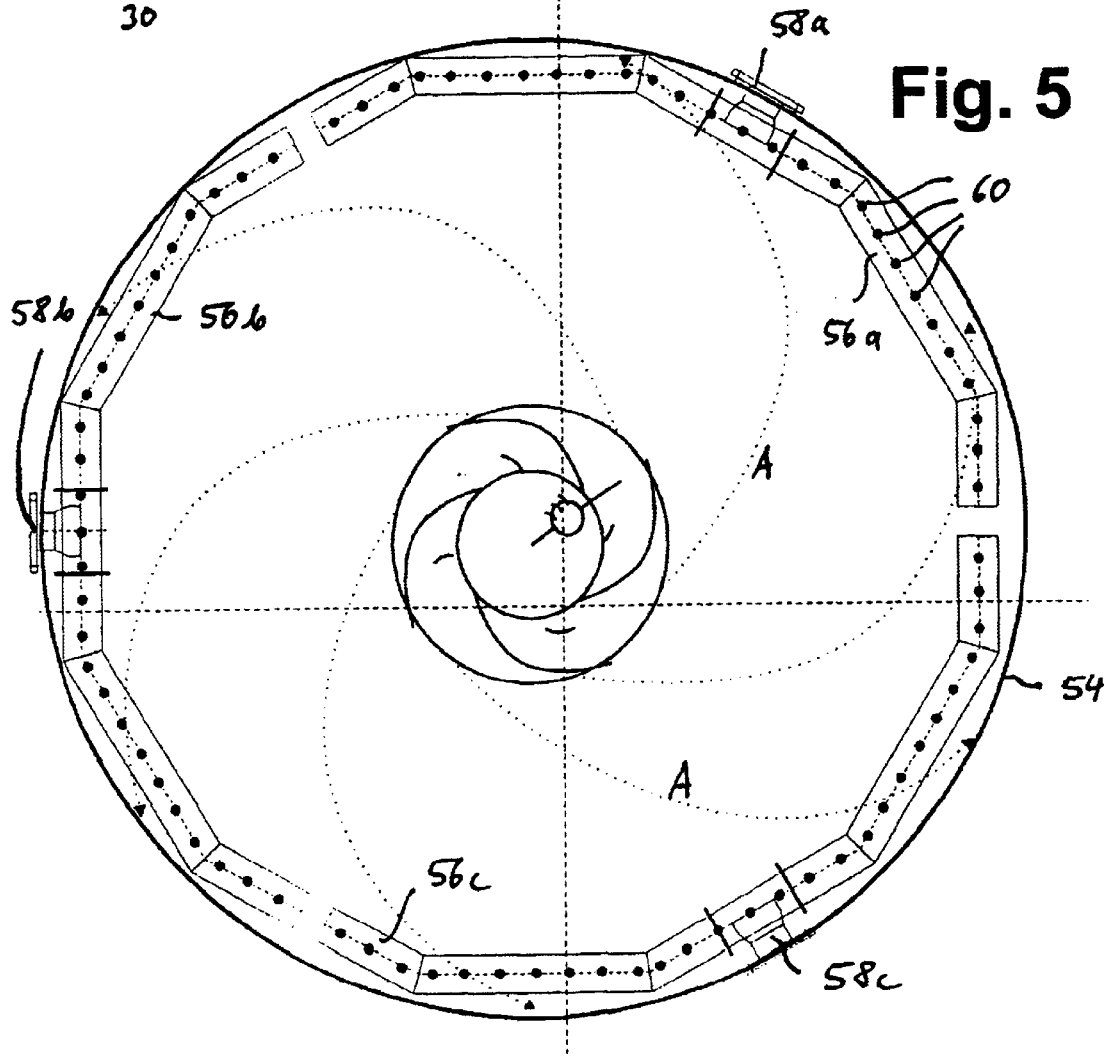

The invention shall be described in greater detail in the following with reference to the attached drawings, showing:

FIG. 1: a schematic vertical cross section through a separating device for solid matter according to the invention;

FIG. 2: a schematic top view onto the device of FIG. 1;

FIG. 3: a representation of the central area of a separating device for solid matter similar to the one of FIG. 1, in cross section;

FIG. 4 a schematic top view onto the device of FIG. 3;

FIG. 5 a preferred embodiment of a liquid outlet device in a top view;

FIG. 6 a perspective detail view of the embodiment of FIG. 5;

FIG. 7 a schematic detail view of an alternative liquid outlet device;

FIG. 8 a schematic top view onto a sludge-removal device in a solid matter separating device according to the invention;

FIG. 9 a schematic side view of the sludge-removal device of FIG. 8;

FIG. 10 four schematic representations regarding the operating mode of an embodiment of a sludge-removal device, and FIG. 11 three views of an alternative embodiment of a sludge-removal device.

The invention shall now be described in greater detail with reference to FIGS. 1 and 2 and/or 3 and 4, respectively. The same reference numbers in the various representations identify the same parts.

The separating device 10 according to the invention, shown in FIGS. 1 and 2, essentially consists of a cylindrical separating tank 12 in the central axial area of which a central structural unit 14 is arranged. This central structural unit 14 comprises a flotation-collecting tank 16, open at the top, which is connected with a flotation discharge outlet 18 as shown in FIGS. 3 and 4. A rotationally symmetrical flocculation reactor 20 is situated underneath the flotation collecting tank 16, said flocculation reactor 20 being closed at the top and on the side and only having horizontal openings in the bottom or a radial peripheral opening below a peripheral edge 22. The flocculation-reactor 20 is configured conically in the embodiment shown in FIG. 1 and cylindrically in the embodiment shown in FIG. 3.

A suspension inlet 24 opens into the upper area of the interior of the flocculation reactor 20, the opening 26 of said inlet 24 being configured diagonally, whereby the angle of inclinaton is at a right angle to the line of tilt 28 shown in FIG. 4.

In the embodiment shown in FIGS. 3 and 4, a pressure-release inlet 32 is provided in the bottom area 30 of the flocculation reactor 20, the inlet aperture of said pressure-release inlet 32 can be adjusted by a conical adjusting piston 34. This adjusting piston 34 is set via am adjusting rod 36 and a hand wheel 38 in the embodiment shown. Of course, in an alternative, it is also possible to adjust the adjusting piston 34 in a motor-driven manner.

In the embodiment shown, the adjusting piston 34 has a substantially larger diameter than the pressure-release inlet 32, as a result, it forms a deflecting edge 35 the purpose of which is to divert the bubble-loaded liquid flowing in via the pressure-release inlet 32 in horizontally radial direction and to prevent a too premature mixing with the suspension flow coming from the top. Alternatively, the adjusting piston 34 can also be made with a smaller diameter and a firmly mounted plate-like baffle can be provided above the adjusting piston 34.

The pressure-release inlet 32 is supplied by a liquid pipe 40 via which a liquid mixed with a released gas is fed. Radially outside of the peripheral edge 22, a number of distribution cells 44 extend adjacent to one another, preferably each having a rectangular flow cross section, which expands radially outward from the flocculation reactor 20 in peripheral direction and vertical direction.

The distribution cells 44 form a channel, curving increasingly in peripheral direction, and are separated from one another by separating walls 46. The number and curvature of the distribution cells 44 is selected in such a way that a desired flow outlet angle of the suspension/bubble mixture is produced which comprises a significant tangential component, i.e. it does not run completely radial. It is again expressly noted that the conically truncated configuration of the flocculation reactor 20, as shown in FIG. 1, or the bell-shaped configuration noted in the claims, also in the embodiment of FIGS. 3 and 4, can be used with a pressure-release inlet 32.

The function of the device of the invention according to FIGS. 1 and 2 is as follows:

A suspension mixed with solid matter (for example, small heavy parts, fibers and other components) is supplied via the suspension inlet 24, said suspension entering the reactor chamber in tangential direction (as indicated by arrow S in FIG. 4) due to the fact that the outlet opening 26 of the suspension inlet 24 is inclined and travels spirally downward in the flocculation reactor 20. The suspension can then flow radially outward into the distribution cells 44 after passing the peripheral edge 22, the already existing rotary movement (velocity component in tangential direction) thereby being intensified by the distribution cells 44. As can be seen especially in FIGS. 1 and 2, the mixture leaving the central structural unit 14 then flows outward at a defined angle to the radial direction, as is indicated by arrow A in FIG. 2.

In this embodiment, a liquid oversaturated with gas is preferably supplied to the suspension before it is introduced via the suspension inlet 24, so that micro bubbles have formed in the mixture to which the solid matter particles to be separated adhere and cause them to float on the liquid surface in the separating tank 12. At the same time, heavy substances can sink to the bottom of the tank 30 where they are removed by removal devices (sediment removers) (not shown) or reach suitable collecting channels. The clarified liquid is then drained off in the area of the outer wall of the separating tank 12, which will be described in greater detail in the following with reference to FIGS. 5–7.

The alternative embodiment shown in FIGS. 3 and 4 functions in a very similar manner as described above, with the exception that a gas-mixed (preferably saturated) liquid such as water is introduced separately from the suspension via the liquid inlet 40, said liquid being released when passing the pressure-release inlet 32, so that micro bubbles 52 form. With increased mixing, the suspension flow and the bubble flow coming from the upper area of the reaction container 20, already mixed in the direction of peripheral rotation, pass outward throught he distribution cells 44.

As a result of the embodiment according to the invention, a velocity component is conveyed in peripheral or tangential direction to the mixture flowing essentially radially outward and consisting of suspension and small bubbles, as a result of which the path covered by flowing through the separating tank 12 is considerably longer compared to a conventional entirely radial flow and an improved degree of separation can be obtained which could only be attained with larger separating tanks or a smaller throughput in conventional devices. Thus, the embodiment according to the invention also enables a more compact structure of the separating device for solid matter.

As shown in FIGS. 5–7, the clarified liquid is removed from the tank in the area of the outer wall 54 of the separating tank 12. In FIGS. 5 and 6, a preferred embodiment of this inventive idea is thereby shown in which the clarified liquid discharges through three outlet pipes 56a, 56b and 56c. These outlet pipes 56 consist of individual straight pipe sections and each extend over about one-third of the entire periphery of the tank wall 54. Of course, more or fewer pipes can also be provided, as long as the liquid is discharged over the entire periphery. Each of the outlet pipes 56 is connected with a clean water outlet 58. As can be seen in FIG. 6, the outlet pipes 56 have a plurality of small openings 60 in their base area via which the clarified liquid can enter into the outlet pipes 56. By arranging the openings 60 in the base area of the outlet pipes, it is prevented that they are blocked by solid matter or particles perhaps falling from the top.

An alternative embodiment of the outlet device for the clarified liquid is shown in FIG. 7, in which opening slots and/or boreholes 62 are provided in the tank wall 54 in the vicinity of the base 30 over the entire periphery, said openings and/or boreholes 62 opening into a collecting line 64 from where the clarified liquid is supplied to one or more clean water outlets 58.

A first embodiment of a sludge-removal device 66a rotating above the separating tank 12 about the vertical central axis of the separating tank 12 is shown in FIGS. 8 to 10. The retaining structure for the sludge-removal device 66a is not shown for reasons of clarity. This sludge-removal device 66a consists essentially of an axis of rotation 68 extending radially vis-à-vis the central axis of the separating tank 12 and to which at least two sludge paddles 70a, 70b are fastened. The axis of rotation 68 with the two paddles 70 is turned about the axis of rotation 68 via a rotational drive 72 and the entire sludge-removal device 66a is simultaneously moved by means of a rotary drive 74 in the direction indicated by arrow U, i.e. clockwise, about the central axis of the separating tank 12. This direction of rotation U is, according to the invention, opposite the movement of rotation of the suspension/bubble mixture indicated by arrow A.

As shown in FIG. 10 with reference to four different positions of the sludge-removal device 66a, the sludge paddles 70a and 70b scoop the sludge 78 that has formed on the surface of the liquid 76 off, convey the scooped sludge 80 during the further rotary movement in direction of the axis of rotation 68 which is inclined vis-à-vis the horizontal to the central axis of the separating tank 12 (as shown in FIG. 9). The scooped sludge 80 falls onto the flotation collecting tank 16, shown in FIGS. 1 and 3, and is then discharged via the flotation discharge pipe 18.

Of special significance for an especially effective scooping of the sludge 78, in particular if it contains fibre particles, is the fact that the rotary movement U of the sludge-removal device 66a is opposite to the movement of the suspension/bubble mixture A, shown in FIGS. 8 and 10, to increase the relative velocity between the sludge 78 to be scooped off and the sludge paddles 70.

A liquid which is under increased pressure and thereby mixed with gas is simultaneously introduced into the mixing chamber below the peripheral edge 22 via the liquid line 40 and the pressure-release inlet 32. A sudden decrease in pressure is produced in the supplied liquid in the aperture in the pressure-release inlet 32 formed by the adjusting piston 34, as a result of which the gas released in the liquid (to the extent that it exceeds the saturation capacity at the pressure prevailing in the bottom of the tank) flows out as micro bubbles 52 of preferably about 10 $\mu$m to 1500 $\mu$m. The adjusting piston 34 can thereby be adjusted axially as required by means of the hand wheel 38 in order to obtain a desired bubble formation dependent on the desired throughput of the liquid supplied via the liquid line 40 while interacting with the increased pressure in the liquid line 40. The liquid mixed with micro bubbles thereby mixes with the suspension being added from the upper area of the flocculation reactor 20, whereby this mixture passes through the flow channel 44, as indicated by arrow K.

To obtain as uniformly decelerating a flow as possible and also to produce as slight unsteadinesses and turbulances as possible during the transition from the flow channel 44 into the main area of the separating tank 12, the height of the flow channel 44 increases steadily radially outward, preferably in a linear manner.

Three configurations of a second embodiment of a sludge-removal device 66b are shown in FIGS. 11a, 11b and 11c. This sludge-removal device 66b, also rotating in the same way as in FIG. 8 above the separating tank 12, has a preferably horizontal axis of rotation 82 which is driven by means of a rotary drive 72. This sludge-removal device 66b comprises several sludge paddles 70c distributed on the periphery of the axis of rotation 82 and a number of bow blades 84 also distributed on the periphery which have a cutting area 86 extending parallel to the axis of rotation 82 and also have tie rods 88a, 88b at both ends for holding the cutting area 86. In the embodiment shown, 6 sludge paddles 70c and 3 bow blades 84 are provided. A ramp 90 and outlet channel 92 are arranged in such a way that the sludge paddles 70c can convey the sludge to be discharged into the outlet channel 92, from where it is conveyed by means of a screw conveyor 94 radially inward into the flotation collecting tank 16. In this embodiment, the axis of rotation 82 turns in the direction indicated by arrow D, whereby the bow blades 84 dip into the sludge 78 and separate parts from it which can be picked up by the following sludge paddles 70c and transported onto the ramp 90, after passing it, the separated sludge falls into the outlet channel 92. The sludge paddles 70c thereby preferably have a curvature 96 directed opposite the direction of rotation D in order to convey the sludge from the ramp 90 completely into the outlet channel 92. During this scooping-off process, the sludge-removal device 66b turns in the direction of rotation indicated by arrow U in FIG. 11c.

What is claimed is:

1. A device for the chemical and physical separation of solid matter, from a suspension, comprising an essentially cylindrical separating tank, in which centrally a rotationally symmetrical flocculation/flow reactor is provided into which at least one suspension inlet directs flow eccentrically, said suspension inlet conducting the supplied suspension into the flocculation reactor and thereby creating a circular flow, wherein the suspension inlet is provided in an upper area of the flocculation reactor and the circular flow drains off from the flocculation reactor downward with tangential and radial components over an outer periphery into circularly arranged distribution cells configured and dimensioned to reinforce the tangential component of the suspension flow when said flow is delivered into the separating tank.

2. The device according to claim 1, wherein the flocculation reactor is configured in a bell-shaped, cylindrical or conically truncated manner and the suspension inlet is situated above an outlet opening.

3. The device according to claim 1, wherein a pressure-release inlet with an annular aperture, via which the release pressure is decreased, is arranged in a base area of the flocculation reactor.

4. The device according to claim 3, wherein a plate-like baffle is provided above the pressure-release inlet.

5. The device according to claim 3, wherein the annular aperture is adjustable, by means of an axially movable adjusting piston, on which a deflecting edge is molded to deflect an emerging flow of bubbles in a horizontal direction.

6. The device according to claim 1, wherein the distribution cells have flow channels with a radially outward increasing cross section.

7. The device according to claim 6, wherein the distribution cells have side walls with an inlet and an outlet, the side walls of the distribution cells, as seen from above, having a cycloidal curvature and a larger tangential component at the outlet than at the inlet.

8. The device according to claim 6 or 7, wherein a ratio of the tangential component to the radial component of the suspension flow velocity at the distribution cell inlet is between 0.3:1 and 1:1.

9. The device according to claim 8, wherein said ratio at the cell inlet is between 0.8:1 and 1:1.

10. The device according to claim 6 or 7, wherein a ratio of the tangential component to the radial component of the suspension flow velocity at the distribution cell outlet is between 1:1 and 50:1.

11. The device according to claim 10, wherein said ratio at the cell outlet is between 2.5:1 and 5:1.

12. The device according to claim 6, wherein the height of the distribution cells increases steadily radially outward.

13. The device according to claim 6, wherein 3 to 10 distribution cells are provided.

14. The device according to claim 1, wherein the at least one suspension inlet comprises devices for obtaining a tangential outflow of the suspension in the reactor interior.

15. The device according to claim 14, wherein the suspension inlet has an inclined end edge and/or a curvature or a deflecting vane in the end area in tangential direction.

16. The device according to claim 1, wherein a plurality of spaced outlet openings are provided in the outer wall of the separating tank which communicate via collecting lines with at least one outlet.

17. The device according to claim 1, wherein the outlet openings are configured slot-like and communicate in groups with 2 to 8, outlets distributed along the periphery of the tank.

18. The device according to claim 1, wherein at least one rotating outlet pipe with a plurality of spaced openings is fastened on the inside to the outer wall of the separating tank, the outlet pipe communicating via a connecting line with an outlet.

19. The device according to claim 18, wherein between 2 and 8, drain pipe sections are provided adjacent to one another and distributed on the periphery, which each communicate via at least one connecting line with their own outlet each.

20. The device according to claim 18 or 19, wherein a drain pipe or drain pipe section consists of several straight pipe pieces connected to one another.

21. The device according to claim 1, further comprising at least one sludge-removal device rotating above the separating tank.

22. The device according to claim 21, wherein the sludge-removal device comprises two sludge paddles, the direction of movement of which, at the immersed moment, is opposite to the tangential component of the suspension flow.

23. The device according to claim 21, wherein the sludge-removal device has a first number of sludge paddles distributed around a rotating shaft and a second number of bow-like blades distributed around the shaft which separate sludge to be removed from the rest of the sludge and convey it into an outlet channel extending parallel to the shaft.

24. The device according to claim 23, wherein a screw conveyor is provided in the outlet channel.

25. The device according to claim 23, wherein the sludge paddles have a bend in the radial centre extending counter to the direction of rotation.

26. The device according to claim 1, wherein the base of the separating tank is configured in an annular channel-like manner and comprises at least one sediment discharge opening.

27. The device according to claim 1, wherein separation is based on a sedimentation principle.

28. A device for separation of solid matter from a suspension, comprising:

a separating tank;

a rotationally symmetrical flocculation/flow reactor disposed centrally in said tank and defining openings along a bottom surface;

a suspension inlet disposed in an upper portion of said reactor and positioned to create a circular flow in said reactor; and a plurality of distribution cells disposed below the reactor to define flow channels having a radially outward increasing cross section, said channels having side walls, an inlet communicating with said openings and an outlet communicating with said separating tank.

29. The device according to claim 28, further comprising:

a flotation collecting tank disposed above the flocculation/flow reactor; and a flotation discharge outlet communicating with said collecting tank and extending to a position outside said separating tank.

30. The device according to claim 29, further comprising a pressure release inlet disposed in said separating tank below the flocculation/flow reactor.

31. The device of claim 29, further comprising peripheral drainage means disposed around a lower portion of said separation tank.

32. The device according to claim 29, further comprising a sludge removal device disposed for rotation around an upper portion of said separating tank and cooperating with said collecting tank for collecting sludge therein.

* * * * *